Nov. 17, 1931. W. HILDEBRAND 1,832,393

SINGLE CHAMBER COMPRESSED AIR BRAKE

Filed Dec. 6, 1929

Inventor,
Wilhelm Hildebrand
by Cushman, Bryant + Darby
attys.

Patented Nov. 17, 1931

1,832,393

UNITED STATES PATENT OFFICE

WILHELM HILDEBRAND, OF LICHTERFELDE, BERLIN, GERMANY

SINGLE CHAMBER COMPRESSED AIR BRAKE

Application filed December 6, 1929, Serial No. 412,174, and in Germany and Austria December 24, 1928.

This invention relates to single chamber compressed air brakes for example of the kind in which a release valve is provided to permit graduated release of the brake, which release valve is connected with the exhaust opening of the control valve.

Such devices are known in which, besides the pressure of the brake cylinder, the train pipe pressure and a constant pressure in a space filled through a non-return valve from the auxiliary air reservoir act on the release apparatus, and in which the auxiliary air reservoir is filled through the known filling groove in the control valve when this is in the release position. With these known devices the release period must be so adjusted by suitable dimensioning of the release bore in relation to the time which is necessary for the filling up of the auxiliary air reservoir, that the auxiliary air reservoir is again completely filled up, when the brake is released after a full braking. Otherwise when the brake is exhausted and after release it is immediately necessary to apply the brake again, it may happen that the auxiliary reservoirs in the back part of the train are not yet charged, or are incompletely charged, so that with a fresh braking the necessary pressure is not at disposal in order to displace the control valve into the braking position. In the case of long trains, such extended release periods have to be given that the working of the brakes becomes difficult.

According to the invention this difficulty is overcome by dividing the auxiliary air reservoir into two chambers, for example a larger and a smaller one, a non-return valve being provided between these two chambers and opening towards the side of the smaller chamber from which side the auxiliary air reservoir is filled through the control valve. A partition between the two chambers, in which the non-return valve is located, may be provided with a choke bore for the filling of the larger chamber of the auxiliary air reservoir.

Figure 1:
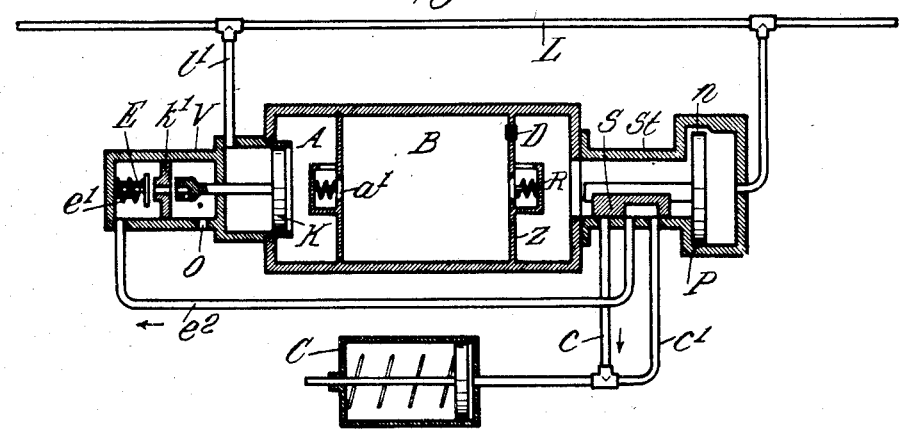

In Figure 1 of the accompanying drawings, a diagrammatic example of the construction of a single chamber brake constructed in accordance with the invention is represented.

L indicates the train pipe, $St$ the control valve, $n$ the filling groove, B the auxiliary air reservoir which is divided by the partition Z into two spaces of which the smaller is on the side towards the control valve $St$. In the partition Z there is a non-return valve R opening towards the smaller space. In addition, the partition Z is provided with a choke bore D. V indicates generally the release apparatus, which comprises the air release valve E provided with a spring $e^1$ and working in conjunction with a piston $k^1$ which is bored through. The movement of this piston is controlled by another piston K which on one side is under the constant pressure of a chamber A filled from the reservoir B through a non-return valve $a^1$, and on the other side is under the variable pipe pressure which influences the piston K through a pipe $l^1$ connecting the train pipe L with the valve housing. The brake cylinder pressure tends to move the bored piston $k^1$ out of reach of the valve E.

On braking, the slide valves of the control valve $St$ opens the duct $c$ leading to the brake cylinder C, so that the auxiliary reservoir air can flow into the brake cylinder. The communication between the duct $c^1$ and the air release duct $e^2$ is cut off by the same movement of the slide valve. In consequence of the fall of the train pipe pressure, the piston K of the release valve V, under the influence of the pressure in the chamber A, moves the bored piston $k^1$ against the air release valve E which then cuts off the communication between the duct $e^2$ and the opening $o$ to the atmosphere.

Now if for the purpose of producing a graduated release, the pressure in the train pipe is only slightly increased, the control piston P in the control valve $St$ is moved to the left and the brake cylinder duct $c^1$ is placed in connection with the duct $e^2$; the brake cylinder pressure combined with the increased train pipe pressure displaces the pistons $k^1$ and K to the right hand side. By the movement of the piston $k^1$ away from the air release valve E, brake cylinder air is allowed to flow out through the bore in the said piston to the opening $o$ to atmosphere, until in consequence of the fall of the brake cylinder pressure the piston K which is exposed to a higher pressure in the chamber A moves the piston $k^1$ again to the left, when the bore in the piston $k^1$ is again closed by the valve E. Owing to the bore D in the partition Z being small, the pressure in the chamber of the reservoir situated to the right of the partition Z, rises more quickly than that in the other chamber of the auxiliary reservoir; therefore a renewed braking operation after the release can be rapidly effected without necessitating a considerable exhaustion of air from the train pipe. For the same reason, the preparation for renewed braking is re-established, even with a long goods train, in a comparatively short time.

The arrangement can also be appropriately used with single chamber compressed air brakes having two control valves acting on the brake and release process, if with the control valve a subsidiary supply of the brake cylinder, in the case of pressure losses, is effected.

Figure 2:
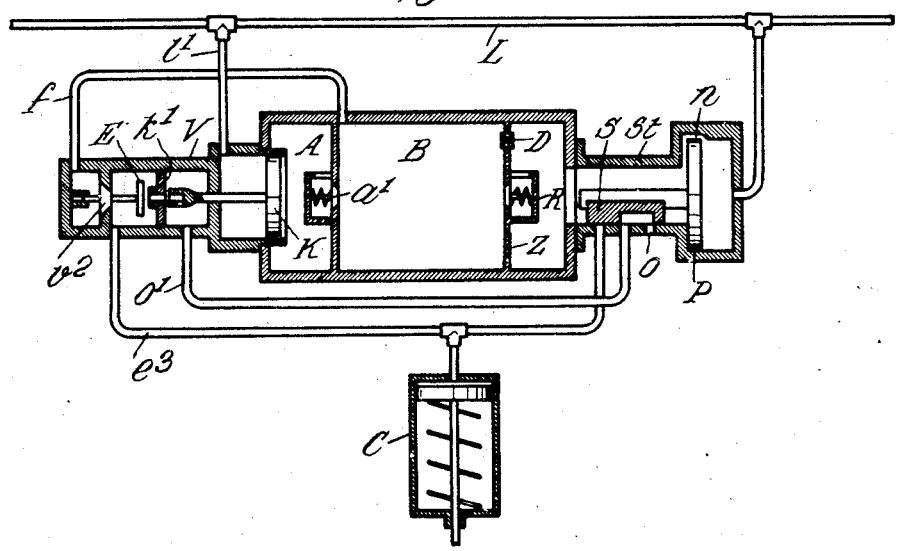

This modification is illustrated in Figure 2, in which the valve E in the casing V acts as a second control valve, and is adapted to be operated by the valve $v^2$, behind which is a connection $f$ from the main chamber B of the auxiliary reservoir. The brake cylinder is directly connected with the casing V by the conduit $e^5$. The exhaust outlet $o$ is located in the casing $St$ of the first control valve, instead of in the casing V, and the conduit $O^1$ connects the portion of the casing V which is located in front of the piston $k^1$ with the said outlet in the release position. When the brake is applied, if the pressure in the brake cylinder falls owing to leakage at its piston, the pistons K and $k^1$ will be actuated by the pressure in the chamber A to reopen the valve $V^2$ and admit a further supply of compressed air to the brake cylinder through the conduit $e^5$.

Figure 3:
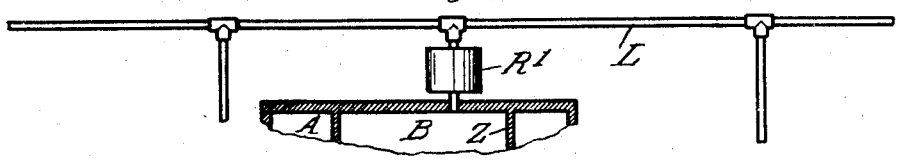

Instead of the hole D made in the partition, a pipe connection between the train pipe and the larger chamber of the auxiliary air reservoir may be provided,—as shown in Figure 3—in which pipe connection is located a non-return valve $R^1$ opening towards the reservoir, and a throttle.

What I claim and desire to secure by Letters Patent of the United States is:—

1. In a compressed air brake, a train pipe, an auxiliary reservoir, a control valve comprising a piston exposed on one side to the variable pressure in the train pipe, and on the other side to auxiliary reservoir pressure, said auxiliary air reservoir being divided into two chambers, one of which chambers is in free communication with the adjacent side of said piston to actuate said piston against said train pipe pressure upon reduction of the latter pressure, and thereby upon said reduction to place said chamber in communication with the brake cylinder, a non-return valve interposed between the said two chambers and adapted to open towards the one of said chambers which is in free communication with the control valve piston to reinforce the pressure in the last named chamber from the contents of the other of said chambers, and means for re-charging said other chamber.

2. In a compressed air brake, a train pipe, an auxiliary reservoir, a control valve comprising a piston exposed on one side to the variable pressure in the train pipe, and on the other side to auxiliary reservoir pressure, said auxiliary air reservoir being divided into two chambers, one of which chambers is in free communication with the adjacent side of said piston to actuate said piston against said train pipe pressure upon reduction of the latter pressure, and thereby upon said reduction to place said chamber in communication with the brake cylinder, a non-return valve interposed between the said two chambers and adapted to open towards the one of said chambers which is in free communication with the control valve piston to reinforce the pressure in the last named chamber from the contents of the other of said chambers, means for re-charging said other chamber, and a release valve adapted to cooperate with said control valve to control the graduated exhaust of air from the brake cylinder, said release valve also being adapted to cooperate in the filling of the brake cylinder.

3. In a compressed air brake, a train pipe, an auxiliary reservoir, a control valve comprising a piston exposed on one side to the variable pressure in the train pipe, and on the other side to auxiliary reservoir pressure, said auxiliary reservoir being divided into two chambers of unequal size, the smaller of said chambers being in free communication with the adjacent side of said piston to actuate said piston against said train pipe pressure upon reduction of the latter pressure and thereby upon said reduction to place said smaller chamber in communication with the brake cylinder, a non-return valve interposed between the said two chambers and adapted to open towards the smaller chamber to reinforce the pressure in the latter from the contents of the larger chamber, and means for re-charging said larger chamber.

4. In a compressed air brake, a train pipe, an auxiliary reservoir, a control valve comprising a piston exposed on one side to the variable pressure in the train pipe and on the other side to auxiliary reservoir pressure, a partition dividing said auxiliary reservoir into an active chamber and a reserve chamber, said active chamber being in free communication with the adjacent side of said piston to actuate said piston against said train pipe pressure upon reduction of the latter pressure, a non-return valve in said partition adapted to open to allow passage of air to the active chamber from the reserve chamber to reinforce the pressure acting against the train pipe pressure, and means for recharging the reserve chamber.

5. In a compressed air brake, a train pipe, a control valve having a filling groove, an auxiliary reservoir, a partition dividing said reservoir into two chambers of unequal size, the smaller of said chambers being in free communication with said control valve to actuate the same against the train pipe pressure on reduction of the latter pressure, and a non-return valve in said partition adapted to open to give passage to air from the larger of said chambers to said smaller chamber, said partition having an aperture to effect filling of said larger chamber from the train pipe through said filling groove and said aperture upon restoration of normal pressure in the train pipe.

6. In a compressed air brake, a train pipe, an auxiliary reservoir, a control valve comprising a piston exposed on one side to the variable pressure in the train pipe and on the other side to auxiliary reservoir pressure, a partition dividing said auxiliary reservoir into an active chamber and a reserve chamber, said active chamber being in free communication with the adjacent side of said piston to actuate said piston against said train pipe pressure upon reduction of the latter pressure, a non-return valve in said partition adapted to give passage to air from said reserve chamber to said active chamber to reinforce the pressure in said active chamber upon application of the brake, and a connection controlled by another non-return valve between said train pipe and said reserve chamber to effect re-charging of said reserve chamber.

WILHELM HILDEBRAND.